United States Patent
Wagoner et al.

(10) Patent No.: US 9,030,174 B2
(45) Date of Patent: May 12, 2015

(54) CURRENT BALANCE CONTROL IN CONVERTER FOR DOUBLY FED INDUCTION GENERATOR WIND TURBINE SYSTEM

(75) Inventors: Robert Gregory Wagoner, Roanoke, VA (US); Robert Allen Seymour, Roanoke, VA (US)

(73) Assignee: General Electric Company, Schenectady, NY (US)

( * ) Notice: Subject to any disclaimer, the term of this patent is extended or adjusted under 35 U.S.C. 154(b) by 326 days.

(21) Appl. No.: 13/615,898

(22) Filed: Sep. 14, 2012

(65) Prior Publication Data

US 2014/0078800 A1 Mar. 20, 2014

(51) Int. Cl.
- *F03D 9/00* (2006.01)
- *H02M 7/5387* (2007.01)
- *H02M 7/493* (2007.01)
- *H02J 3/38* (2006.01)

(52) U.S. Cl.
CPC ............ *H02M 7/53871* (2013.01); *Y02E 10/76* (2013.01); *H02J 3/386* (2013.01); *H02M 7/493* (2013.01)

(58) Field of Classification Search
USPC .................. 290/44, 55; 322/20; 700/286, 287; 363/37, 127, 132
See application file for complete search history.

(56) References Cited

U.S. PATENT DOCUMENTS

| | | | |
|---|---|---|---|
| 5,034,874 A * | 7/1991 | Araki ............................... | 363/41 |
| 5,262,935 A * | 11/1993 | Shirahama et al. ............. | 363/71 |
| 5,483,435 A * | 1/1996 | Uchino ........................... | 363/81 |
| 5,526,252 A * | 6/1996 | Erdman .......................... | 363/41 |
| 6,545,450 B1 | 4/2003 | Ledenev et al. | |
| 6,751,106 B2 | 6/2004 | Zhang et al. | |
| 233,690 A1 | 11/2004 | Ledenev et al. | |
| 6,856,041 B2 | 2/2005 | Siebenthaler et al. | |
| 7,253,537 B2 | 8/2007 | Weng et al. | |
| 54,874 A1 | 3/2008 | Chandrasekaran et al. | |
| 254,168 A1 | 10/2010 | Chandrasekaran | |
| 277,137 A1 | 11/2010 | Zhao et al. | |
| 7,876,191 B2 | 1/2011 | Chandrasekaran et al. | |
| 106,470 A1 | 5/2011 | Yin et al. | |
| 7,964,980 B2 | 6/2011 | Ichinose et al. | |
| 299,311 A1 | 12/2011 | Zhu et al. | |
| 8,076,790 B2 | 12/2011 | Ichinose et al. | |
| 8,093,741 B2 | 1/2012 | Ritter et al. | |
| 2005/0169026 A1 * | 8/2005 | Shinohara ...................... | 363/132 |
| 2007/0177314 A1 * | 8/2007 | Weng et al. ..................... | 361/20 |
| 2008/0074911 A1 * | 3/2008 | Petter ............................... | 363/65 |
| 2009/0244945 A1 * | 10/2009 | Hatanaka ....................... | 363/127 |
| 2009/0316453 A1 * | 12/2009 | Manabe et al. ................. | 363/78 |
| 2010/0327584 A1 * | 12/2010 | Fortmann ........................ | 290/44 |
| 2011/0049903 A1 * | 3/2011 | Jorgensen et al. ............. | 290/55 |

\* cited by examiner

*Primary Examiner* — Julio C. Gonzalez Ramirez
(74) *Attorney, Agent, or Firm* — Dority & Manning, P.a.

(57) ABSTRACT

Systems and methods for reducing current imbalance between parallel bridge circuits used in a power converter of a doubly fed induction generator (DFIG) system are provided. A control system can monitor the bridge current of each of the bridge circuits coupled in parallel and generate a feedback signal indicative of the difference in bridge current between the parallel bridge circuits. Command signals for controlling the bridge circuits can then be developed based on the feedback signal to reduce current imbalance between the bridge circuits. For instance, the pulse width modulation of switching devices (e.g. IGBTs) used in the bridge circuits can be modified to reduce current imbalance between the parallel bridge circuits.

17 Claims, 5 Drawing Sheets

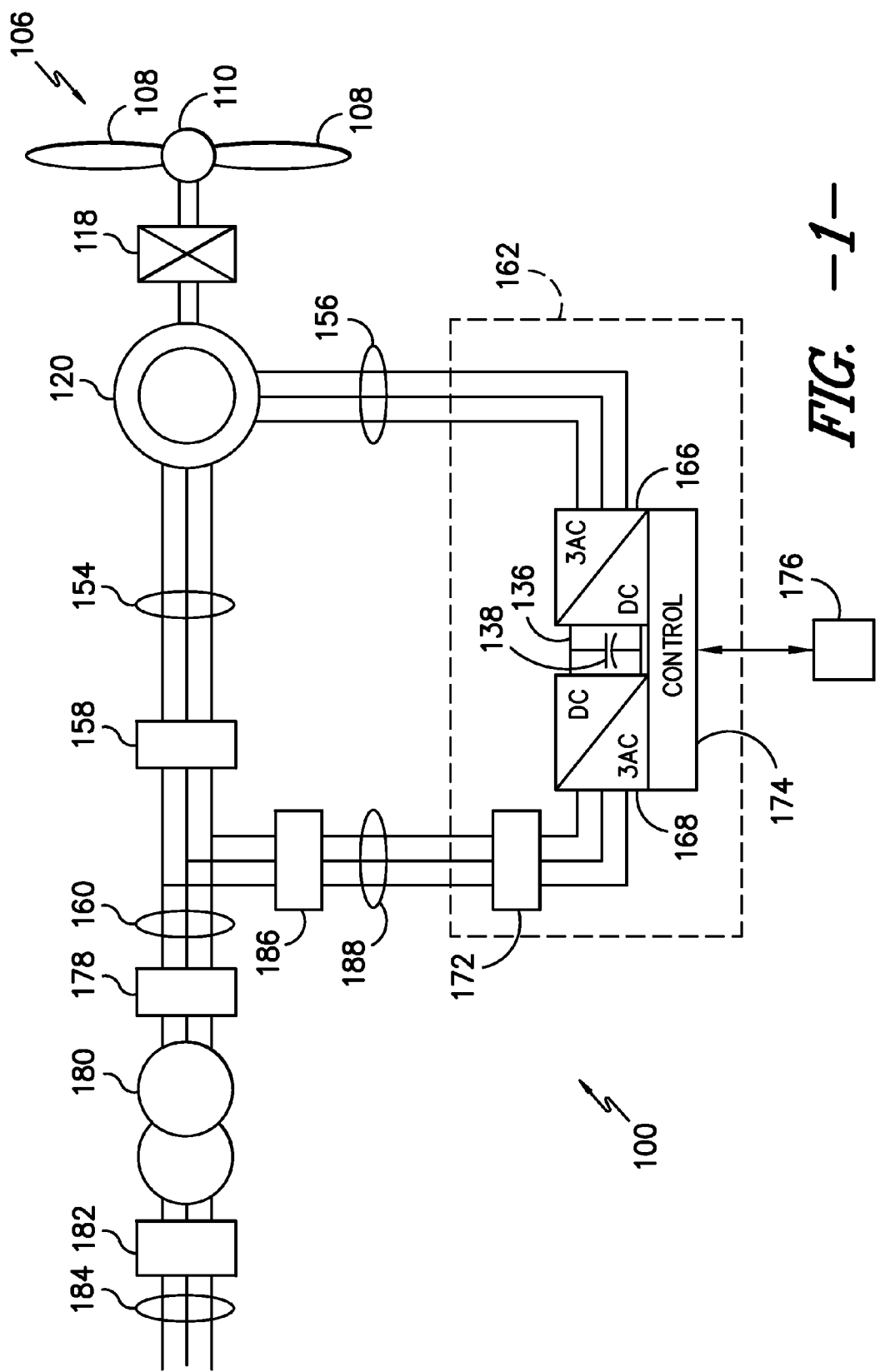
FIG. -1-

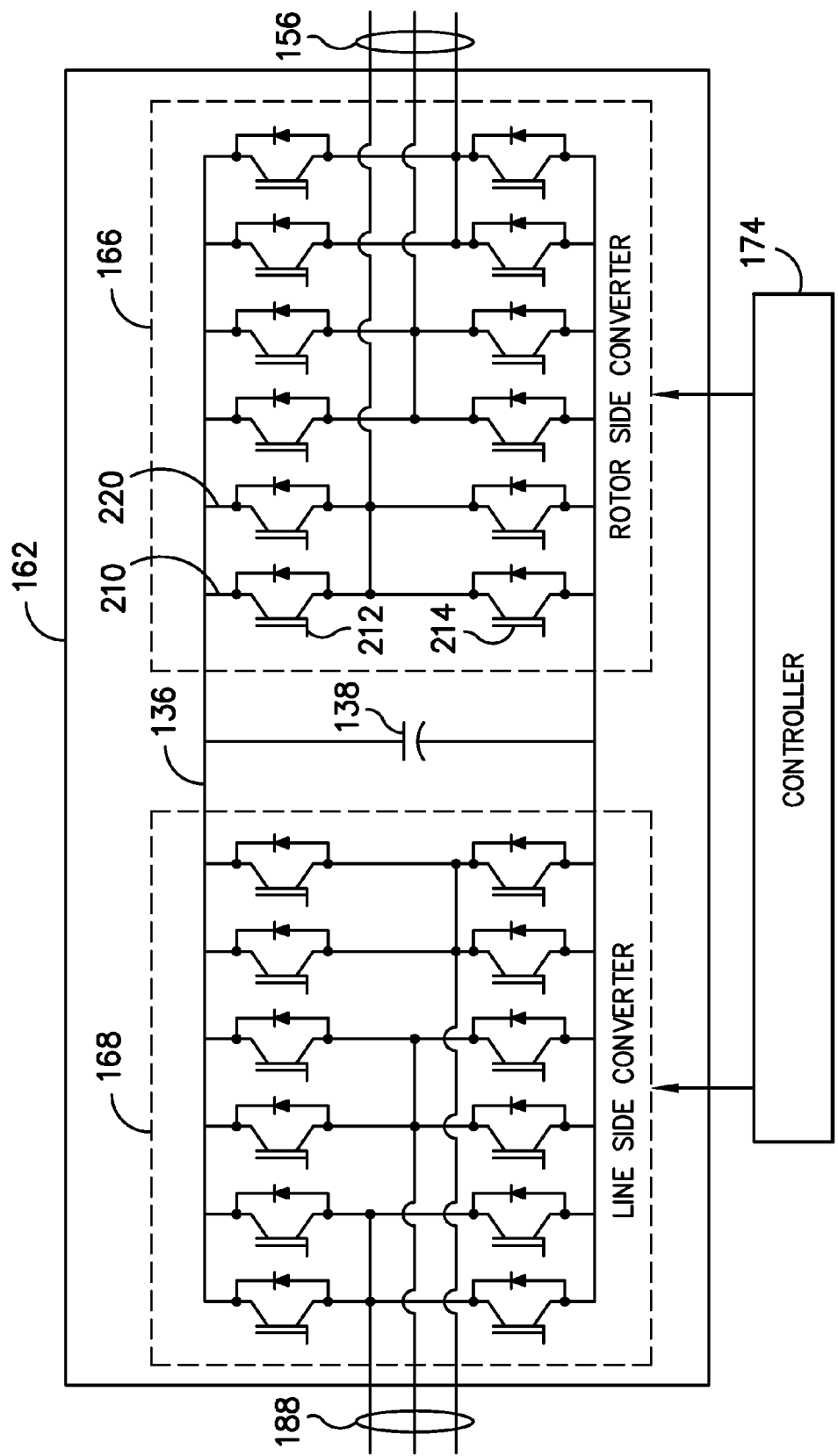
FIG. -2-

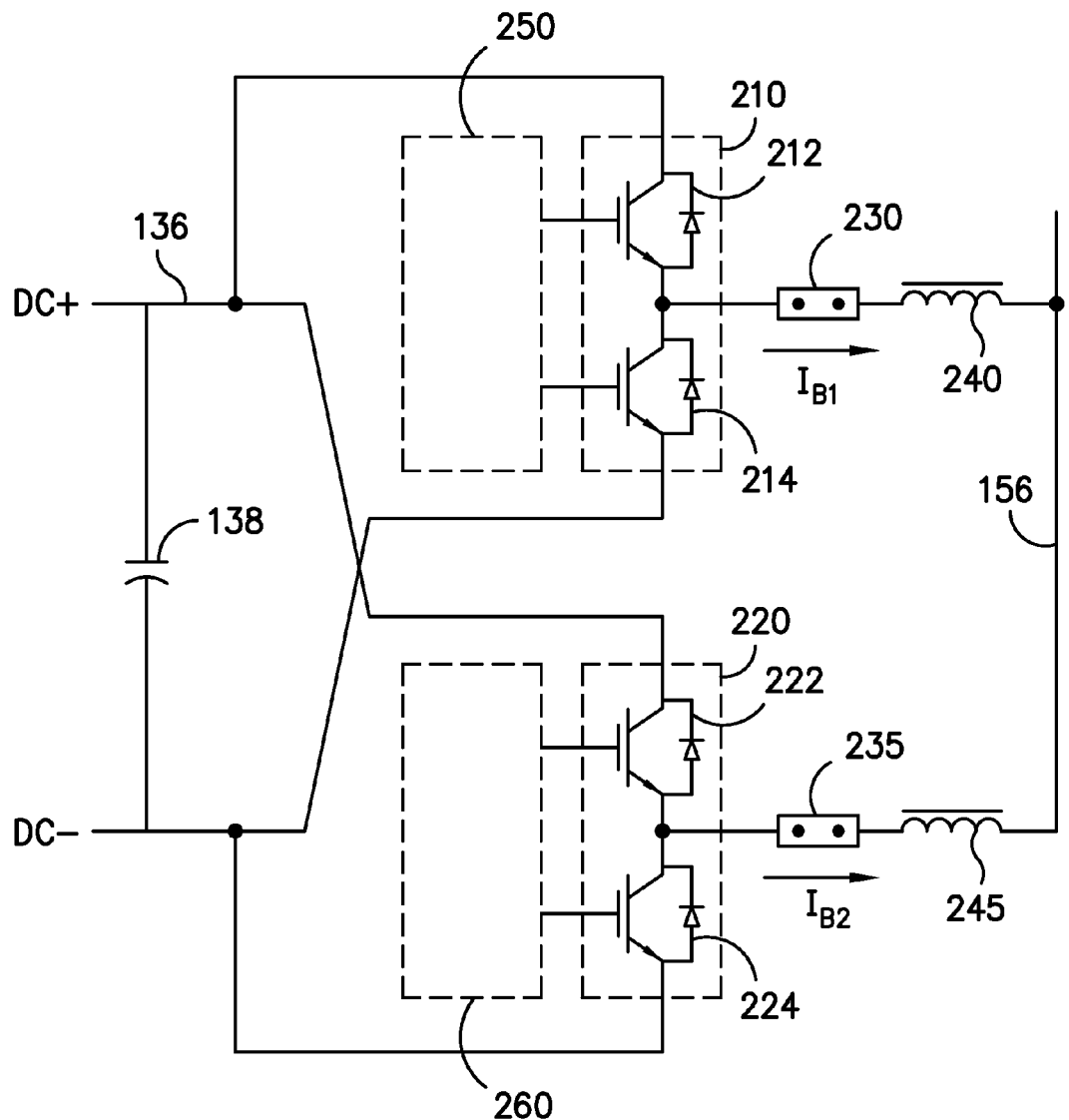
FIG. -3-

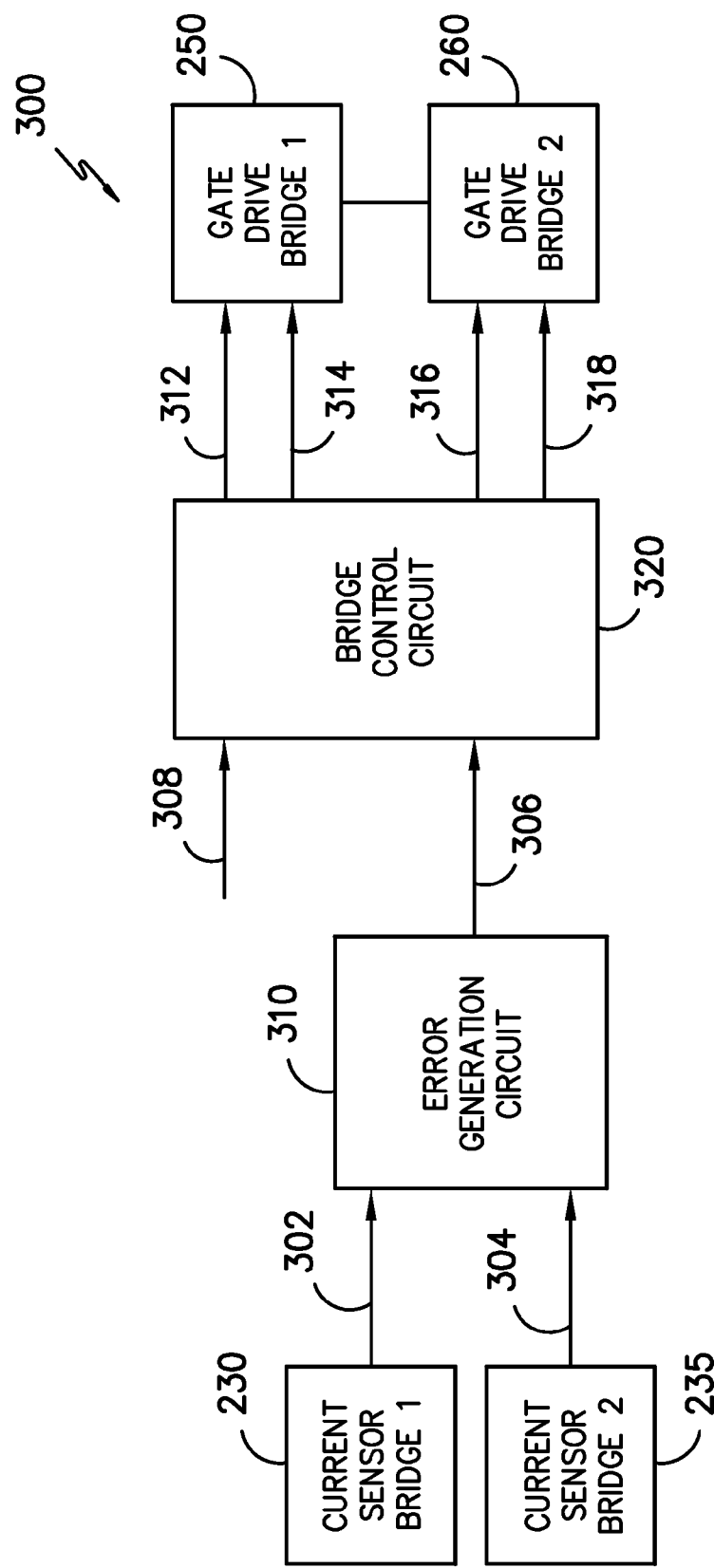
FIG. -4-

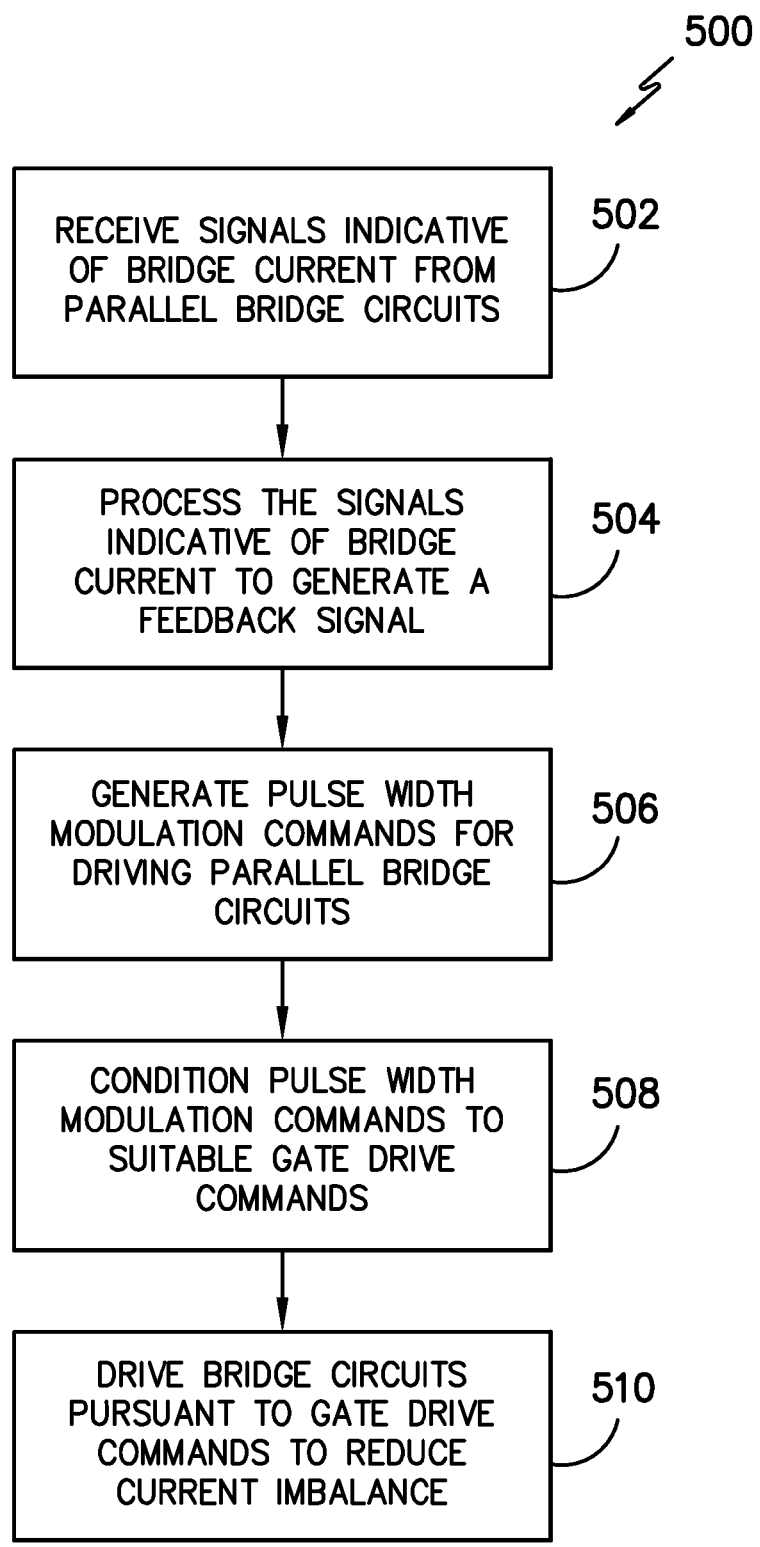
FIG. −5−

CURRENT BALANCE CONTROL IN CONVERTER FOR DOUBLY FED INDUCTION GENERATOR WIND TURBINE SYSTEM

FIELD OF THE INVENTION

The present disclosure relates generally to renewable energy sources, and more particularly to a systems and methods of improving output power for a doubly fed induction generator (DFIG) wind turbine system.

BACKGROUND OF THE INVENTION

Wind turbines have received increased attention as a renewable energy source. Wind turbines use the wind to generate electricity. The wind turns multiple blades connected to a rotor. The spin of the blades caused by the wind spins a shaft of the rotor, which connects to a generator that generates electricity. Certain wind turbine systems include a doubly fed induction generator (DFIG) to convert wind energy into electrical power suitable for output to an electrical grid. DFIGs are typically connected to a converter that regulates the flow of electrical power between the DFIG and the grid. More particularly, the converter allows the wind turbine to output electrical power at the grid frequency regardless of the rotational speed of the wind turbine blades.

Increased power DFIG systems can use a converter system that includes multiple bridge circuits connected in parallel for each output phase of the DFIG. When multiple bridge circuits are connected in parallel, the current sharing between the parallel bridge circuits during transients, such as at turn-on and at turn-off, does not balance. A number of factors can lead to this imbalance. For example, driver circuits used to drive the switching devices (e.g. insulated gate bipolar transistors (IGBTs)) used in the bridge circuits can contain opto-couplers for isolation of control signals. Each of these opto-couplers can provide different delay times in the control signals. Different delay times in the control signals can cause differences in the switching times of the switching devices (e.g. IGBTs) used in the bridge circuits. Any difference in timing between switching of the switching devices can cause a voltage across an inductor coupled to an output of the converter, leading to a circulating current between the parallel bridge circuits.

The imbalance in current can result in a difference of temperatures in the switching devices used in the parallel bridge circuits, such as a difference in junction temperature of IGBTs used in the switching modules. This reduces the overall output power capability of the converter as the total output current capability will be limited by the switching device with the highest temperature.

Thus, a need exists for a system and method of current balance control across parallel bridge circuits in a converter used for a DFIG wind turbine system. A system and method that reduces current imbalance across the parallel bridge circuits would be particularly useful.

BRIEF DESCRIPTION OF THE INVENTION

Aspects and advantages of the invention will be set forth in part in the following description, or may be obvious from the description, or may be learned through practice of the invention.

One exemplary aspect of the present disclosure is directed to a control system for reducing current imbalance in a power converter of a doubly fed induction generator system. The power converter is coupled to a rotor of a doubly fed induction generator. The power converter includes a plurality of bridge circuits coupled in parallel. The control system includes a plurality of current sensors. Each of the plurality of current sensors is coupled to one of the plurality of bridge circuits and is capable of providing a signal indicative of the bridge current of one of the plurality of bridge circuits. The control system further includes an error generation circuit coupled to the plurality of current sensors. The error generation circuit is operable to process signals indicative of bridge current received from the current sensors to generate a feedback signal indicative of the difference in bridge current between the plurality of bridge circuits. The system further includes a control circuit coupled to the error generation circuit. The control circuit is configured to generate control commands for driving each of the plurality of bridge circuits based at least in part on the feedback signal.

Another exemplary aspect of the present disclosure is directed to a method for reducing current imbalance in a power converter of a doubly fed induction generator system. The power converter is coupled to a rotor of a doubly fed induction generator. The power converter includes first and second bridge circuits coupled in parallel. The method includes receiving a first signal from a first current sensor indicative of a bridge current of the first bridge circuit and receiving a second signal from a second current sensor indicative of a bridge current of the second bridge circuit. The method further includes processing the first and second signal to generate a feedback signal indicative of the difference between the bridge current of the first bridge circuit and the bridge current of the second bridge circuit. The method further includes generating control commands for driving the first and second bridge circuits based on the feedback signal to reduce current imbalance between the first and second bridge circuits.

Yet another exemplary aspect of the present disclosure is directed to a wind turbine system. The wind turbine system includes a wind driven doubly-fed induction generator having a stator and a rotor. The stator is coupled to an electrical grid. The wind turbine system further includes a power converter. The power converter includes a plurality of bridge circuits coupled in parallel and is configured to couple the rotor of the wind driven doubly-fed induction generator to the electrical grid. The wind turbine system further includes a control system configured to control the power converter. The control system is configured to monitor a bridge current of each of the plurality of bridge circuits coupled in parallel. The control system is further configured to generate a feedback signal indicative of the difference in bridge current between the plurality of bridge circuits coupled in parallel based on the bridge current of each of the plurality of bridge circuits. The control system is further configured to generate control commands for driving each of the plurality of bridge circuits based at least in part on the feedback signal.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 depicts an exemplary doubly fed induction generator (DFIG) wind turbine system according to an exemplary embodiment of the present disclosure;

FIG. 2 depicts aspects of an exemplary power converter used in a DFIG wind turbine system according to an exemplary aspect of the present disclosure;

FIG. 3 depicts a circuit diagram of exemplary parallel bridge circuits used in a rotor side converter according to an exemplary embodiment of the present disclosure;

FIG. 4 depicts exemplary control topology for a control system for reducing current imbalance among parallel bridge circuits in a power converter of a DFIG wind turbine system according to an exemplary embodiment of the present disclosure; and FIG. 5 depicts a flow diagram of an exemplary method for reducing current imbalance among parallel bridge circuits in a power converter of a DFIG wind turbine system according to an exemplary embodiment of the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to systems and methods for reducing current imbalance between parallel bridge circuits used in a power converter of a doubly fed induction generator (DFIG) system. The DFIG system can include a wind driven doubly fed induction generator having a rotor and a stator. The power converter can be used to couple the rotor of the doubly fed induction generator to an electrical grid. The power converter can be a two stage power converter that includes a rotor side converter and a line side converter coupled together by a DC link. The rotor side converter and/or the line side converter can include a plurality of bridge circuits coupled in parallel. Each of the bridge circuits can include a pair of switching devices, such as insulated gate bipolar transistors (IGBTs), coupled in series with one another. The bridge circuits can be controlled, for instance using gate timing commands provided to the IGBTs, to provide a desired output to the electrical grid.

According to aspects of the present disclosure, a control system can to monitor the bridge current of each of the plurality of bridge circuits coupled in parallel with a plurality of current sensors. The control system can generate a feedback signal based on the difference in bridge current between the parallel bridge circuits. Command signals for controlling the bridge circuits can then be developed based on the feedback signal to reduce current imbalance between the bridge circuits. For instance, the pulse width modulation of switching devices (e.g. IGBTs) used in the bridge circuits can be modified to reduce current imbalance between the parallel bridge circuits.

In this manner, a current balancing optimization scheme can be provided to improve current sharing between the parallel bridge circuits. Imbalance in current sharing between parallel bridge circuits reduces the total output capability and efficiency of the power converter. In particular, the total output current is limited by the temperature of the highest stressed device in the parallel bridge circuits with the lower stressed devices not achieving their full output capability. Increased balance in current sharing between parallel bridge circuits as provided by aspects of the present disclosure can result in a more reliable converter system with increased output current capability. For instance, the parallel bridge circuits can be controlled to have balanced currents such that reduced power is dissipated as current circulating between parallel bridges.

Referring to FIG. 1, an exemplary DFIG wind turbine system 100 will now be discussed in detail. The present disclosure will be discussed with reference to the exemplary DFIG wind turbine system 100 of FIG. 1 for purposes of illustration and discussion. Those of ordinary skill in the art, using the disclosures provided herein, should understand that aspects of the present disclosure are also applicable in other systems.

In the exemplary system 100, a rotor 106 includes a plurality of rotor blades 108 coupled to a rotating hub 110, and together define a propeller. The propeller is coupled to an optional gear box 118, which is, in turn, coupled to a generator 120. In accordance with aspects of the present disclosure, the generator 120 is a doubly fed induction generator (DFIG) 120.

DFIG 120 is typically coupled to a stator bus 154 and a power converter 162 via a rotor bus 156. The stator bus provides an output multiphase power (e.g. three-phase power) from a stator of DFIG 120 and the rotor bus 156 provides an output multiphase power (e.g. three-phase power) of the DFIG 120. Referring to the power converter 162, DFIG 120 is coupled via the rotor bus 156 to a rotor side converter 166. The rotor side converter 166 is coupled to a line side converter 168 which in turn is coupled to a line side bus 188.

In exemplary configurations, the rotor side converter 166 and the line side converter 168 are configured for normal operating mode in a three-phase, pulse width modulation (PWM) arrangement using insulated gate bipolar transistors (IGBTs) switching devices as will be discussed in more detail with respect to FIG. 2. The rotor side converter 166 and the line side converter 168 can be coupled via a DC link 136 across which is the DC link capacitor 138.

The power converter 162 can be coupled to a controller 174 to control the operation of the rotor side converter 166 and the line side converter 168. It should be noted that the controller 174, in typical embodiments, is configured as an interface between the power converter 162 and a control system 176.

In typical configurations, various line contactors and circuit breakers including, for example, grid breaker 182 can be included for isolating the various components as necessary for normal operation of DFIG 120 during connection to and disconnection from the electrical grid 184. A system circuit breaker 178 can couple the system bus 160 to transformer 180, which is coupled to the electrical grid 184 via grid breaker 182.

In operation, power generated at DFIG 120 by rotating the rotor 106 is provided via a dual path to electrical grid 184. The dual paths are defined by the stator bus 154 and the rotor bus 156. On the rotor bus side 156, sinusoidal multi-phase (e.g. three-phase) alternating current (AC) power is provided to the power converter 162. The rotor side power converter 166 converts the AC power provided from the rotor bus 156 into direct current (DC) power and provides the DC power to the DC link 136. As will be discussed in more detail below, switching devices (e.g. IGBTs) used in parallel bridge circuits of the rotor side power converter 166 can be modulated to convert the AC power provided from the rotor bus 156 into DC power suitable for the DC link 136.

The line side converter 168 converts the DC power on the DC link 136 into AC power suitable for the electrical grid 184. In particular, switching devices (e.g. IGBTs) used in bridge circuits of the line side power converter 168 can be modulated to convert the DC power on the DC link 136 into AC power on the line side bus 188. The AC power from the power converter 162 can be combined with the power from the stator of DFIG 120 to provide multi-phase power (e.g. three-phase power) having a frequency maintained substantially at the frequency of the electrical grid 184 (e.g. 50 Hz/60 Hz).

Various circuit breakers and switches, such as grid breaker 182, system breaker 178, stator sync switch 158, converter breaker 186, and line contactor 172 can be included in the system 100 to connect or disconnect corresponding buses, for example, when current flow is excessive and can damage components of the wind turbine system 100 or for other operational considerations. Additional protection components can also be included in the wind turbine system 100.

The power converter 162 can receive control signals from, for instance, the control system 176 via the controller 174. The control signals can be based, among other things, on sensed conditions or operating characteristics of the wind turbine system 100. Typically, the control signals provide for control of the operation of the power converter 162. For example, feedback in the form of sensed speed of the DFIG 120 can be used to control the conversion of the output power from the rotor bus 156 to maintain a proper and balanced multi-phase (e.g. three-phase) power supply. Other feedback from other sensors can also be used by the controller 174 to control the power converter 162, including, for example, stator and rotor bus voltages and current feedbacks. Using the various forms of feedback information, switching control signals (e.g. gate timing commands for IGBTs), stator synchronizing control signals, and circuit breaker signals can be generated.

FIG. 2 depicts aspects of an exemplary power converter 162 in accordance with aspects of the present disclosure. As illustrated, both the rotor side converter 166 and the line side converter 168 include a plurality of bridge circuits coupled in parallel. More particularly, each phase of the rotor bus 156 input to the rotor side converter 166 is coupled to two bridge circuits (e.g. bridge circuits 210 and 220) coupled in parallel. Each phase of the line side bus 188 output from the line side converter 168 is coupled to two bridge circuits coupled in parallel. Using parallel bridge circuits can increase the output capability of the power converter 162.

In FIG. 2, both the line side converter 168 and the rotor side converter 166 are illustrated as having parallel bridge circuits for exemplary purposes. Those of ordinary skill in the art, using the disclosures provided herein, should appreciate that either the line side converter 168, the rotor side converter 166, or both the line side converter 168 and the rotor side converter 166 can include parallel bridge circuits without deviating from the scope of the present disclosure.

Each bridge circuit includes a plurality of IGBTs coupled in series with one another. For instance, each bridge circuit includes an upper IGBT (e.g. IGBT 212) and a lower IGBT (e.g. IGBT 214). A diode is coupled in parallel with each of the IGBTs. The line side converter 168 and the rotor side converter 166 are controlled, for instance, by providing gate timing commands, using a suitable driver circuit, to the gates of the IGBTs. For example, the controller 174 can provide suitable gate timing commands to the gates of the IGBTs of the bridge circuits. The gate timing commands can control the pulse width modulation of the IGBTs to provide a desired output. It will be appreciated by those of ordinary skill in the art that other suitable switching devices can be used in place of IGBTs.

FIG. 3 depicts a circuit diagram of exemplary paralleled bridge circuits 210 and 220 used in the rotor side converter 166 of power converter 162 according to an exemplary embodiment of the present disclosure. As depicted, a first bridge circuit 210 including upper IGBT 212 and lower IGBT 214 is coupled in parallel with a second bridge circuit 220 including upper IGBT 222 and lower IGBT 224. The first bridge circuit 210 and the second bridge circuit 220 each have a bridge line coupled to the rotor bus 156 through respective inductive elements 240 and 245. The inductive elements 240 and 245 are effectively coupled between the bridge circuits 210 and 220. The first bridge circuit 210 and the second bridge circuit 220 are also coupled to the DC link 136.

As illustrated, the first bridge circuit 210 is in communication with a driver circuit 250 that is configured to provide gate driving signals to the gates of the upper IGBT 212 and the lower IGBT 214 of the first bridge circuit 210 to control the pulse width modulation of the upper IGBT 212 and the lower IGBT 214. Similarly, the second bridge circuit 220 is in communication with a driver circuit 260 that is configured to provide gate driving signals to the gates of the upper IGBT 222 and the lower IGBT 224 of the second bridge circuit 220 to control the pulse width modulation of the upper IGBT 222 and the lower IGBT 224.

As discussed above, first bridge circuit 210 can provide a first bridge current $I_{B1}$ and second bridge circuit 220 can provide a second bridge current $I_{B2}$. Different delay times in the gate timing commands provided by the driver circuits 250 and 260 can cause differences in the switching times of the IGBTs used in the bridge circuits 210 and 220. This difference in timing can cause a voltage across an inductive load (e.g. inductive elements 240 and 245), leading to a circulating current between the parallel bridge circuits. This circulating current can cause an imbalance in the bridge currents $I_{B1}$ and $I_{B2}$, resulting in less efficient operation of the power converter 162.

According to aspects of the present disclosure, the operation of the parallel bridge circuits 210 and 220 can be controlled to reduce imbalance in the bridge current $I_{B1}$ and $I_{B2}$. In particular, the bridge currents $I_{B1}$ and $I_{B2}$ can be monitored using a suitable current sensor. FIG. 3 depicts the use of a current shunt 230 to monitor bridge current $I_{B1}$ and a current shunt 235 to monitor bridge current $I_{B2}$. Other suitable current measurement devices or sensors can be used without deviating from the present disclosure. Signals indicative of the bridge current $I_{B1}$ and $I_{B2}$ can be used to regulate the switching of IGBTs used in the bridge circuits 210 and 220 to reduce current imbalance.

More particularly, FIG. 4 depicts exemplary control topology of a control system 300 for reducing current imbalance between parallel bridge circuits, such as parallel bridge circuits 210 and 220, according to an exemplary aspect of the present disclosure. As shown, the control system includes an error generation circuit 310 that receives signals 302 and 304 indicative of bridge current from current sensors, such as current shunts 230 and 235 of FIG. 3. Referring to FIG. 4, error generation circuit 310 is configured to process signals 302 and 304 to generate a feedback signal 306 indicative of the difference in bridge current between the plurality of bridge circuits coupled in parallel. The feedback signal 306 can be indicative of the difference in magnitude and in phase of the bridge current between the parallel bridge circuits. For instance, the feedback signal can be a complex signal that includes a real component indicative of the difference in magnitude between the parallel bridge circuits and a reactive component indicative of a difference in phase in bridge current between the parallel bridge circuits.

The error generation circuit 310 can include any suitable control device or combination of control devices. In one aspect, error generation circuit 310 includes summers, compensating regulators, and other devices used to process signals 302 and 304 indicative of bridge current. In another embodiment, error generation circuit 310 can include a processing device (e.g. microprocessor, microcontroller, etc.) executing computer-readable instructions stored in a computer-readable medium. The instructions when executed by the processing device can cause the processing device to process signals 302 and 304 indicative of bridge current to generate the feedback signal 306.

As shown in FIG. 4, the error generation circuit 310 provides the feedback signal 306 to control circuitry, such as bridge control circuit 320. The bridge control circuit 320 is configured to process the feedback signal 306 along with other control signals indicative of other control parameters (e.g. control signal 308) to generate control commands for driving the IGBTs of the parallel bridge circuits.

For example, the bridge control circuit 320 can process signals 306 and 308 to generate pulse width modulation commands for driving the IGBTs used in the parallel bridge circuits. In particular, the bridge control circuit 320 can generate a control command 312 to control pulse width modulation of an upper IGBT of a first bridge circuit and a control command 314 to control pulse width modulation of a lower IGBT of the first bridge circuit. The bridge control circuit 320 can also generate a control command 316 to control pulse width modulation of an upper IGBT of a second bridge circuit and a control command 318 to control pulse width modulation of a lower IGBT of the second bridge circuit. The control commands 312, 314, 316, and 318 are determined to provide a desired output of the power converter as well as to reduce current imbalance between parallel bridge circuits used in the power converter. For instance, the bridge control circuit 320 can generate common-mode and/or normal mode current components that are used to regulate the bridge currents of the parallel bridge circuits to reduce the difference between the bridge currents of the parallel bridge circuits. The difference in current can be regulated by adjusting the pulse width modulation provided by control commands 312, 314, 316, and 318.

Similar to error generation circuit 310, the bridge control circuit 320 can include any suitable control device or combination of control devices. In one embodiment, the bridge control circuit 310 can include regulators and other devices used to process signals 306 and 308 to generate control commands. In another embodiment, bridge control circuit 330 can include a processing device (e.g. microprocessor, microcontroller, etc.) executing computer-readable instructions stored in a computer-readable medium. The instructions when executed by the processing device can cause the processing device to process signals 306 and 308 to generate the control commands. Although error generation circuit 310 and bridge control circuit 320 are illustrated as separated devices in FIG. 4, the error generation circuit 310 and bridge control circuit 320 can be implemented using the same device or across multiple devices without deviating from the scope of the present disclosure.

As further illustrated in FIG. 4, the control commands 312, 314, 316, and 318 are provided to gate driver circuits associated with the bridge circuits. More particularly, control commands 312 and 314 are provided to the gate driver circuit 250 and control commands 316 and 318 are provided to the gate driver circuit 260. The gate driver circuits 250 and 260 are configured to condition the control commands into signals suitable for driving the gates of the IGBTs used in the bridge circuits. For instance, the gate driver circuits 250 and 260 can be configured to amplify, isolate, and/or level shift the control commands to suitable signals for driving the IGBTs associated with the bridge circuits.

FIG. 5 depicts a flow diagram of an exemplary method (500) for reducing current imbalance between parallel bridge circuits used in a power converter of a DFIG wind turbine system according to an exemplary embodiment of the present disclosure. The method (500) can be implemented using any suitable control system, such as the control system illustrated in FIG. 4. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined and/or adapted in various ways.

At (502), the method includes receiving signals indicative of bridge currents from parallel bridge circuits used in a power converter of a DFIG wind turbine system. For instance, the method can include receiving a first signal indicative of bridge current from a first current sensor configured to monitor current associated with a first bridge circuit and receiving a second signal indicative of bridge current from a second current sensor configured to monitor current associated with a second bridge circuit coupled in parallel with the first bridge circuit. The signals can be received from any suitable current sensor or current measurement device, such as a current shunt.

At (504), the signals indicative of bridge current are processed to generate a feedback signal. The feedback signal can be indicative of the difference between the bridge current of the first bridge circuit and the bridge current of the second bridge circuit. In one aspect, the feedback signal is a complex signal that includes a real component indicative of the difference in magnitude of the bridge currents and a reactive component indicative of the difference in phase of the bridge currents.

At (506), the method includes generating control commands, such as pulse width modulation commands, to drive the switching devices (e.g. IGBTs) used in the bridge circuits based on the feedback signal. In particular, pulse width modulation commands can be generated to reduce the current imbalance or the difference in bridge current between the parallel bridge circuits. The pulse width modulation commands can adjust the pulse width modulation of one or more of the switching devices used in the bridge circuits such that there is reduced circulating current between the parallel bridge circuits during transient conditions.

At (508), the pulse width modulation commands are conditioned into signals suitable for driving the switching devices, such as signals suitable for driving the gates of IGBTs used in the bridge circuits. For example, the method can include amplifying, isolating, and/or level shifting the pulse width modulation commands to control signals suitable for driving the switching devices used in the bridge circuits.

Finally at (510), the method includes modulating the switching devices (e.g. IGBTs) of the bridge circuits pursuant to the pulse width modulation commands. Preferably, the switching devices are modulated such that current balance between the parallel bridge circuits is improved, leading to more efficient operation of the power converter.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A control system for reducing current imbalance in a power converter of a doubly fed induction generator system, the power converter coupled to a rotor of a doubly fed induction generator, the power converter comprising a plurality of bridge circuits coupled in parallel, the control system comprising:
a plurality of current sensors, each of the plurality of current sensors coupled to one of the plurality of bridge circuits and capable of providing a signal indicative of the alternating current bridge current of one of the plurality of bridge circuits;
an error generation circuit coupled to the plurality of current sensors, the error generation circuit operable to process signals indicative of bridge current received from the current sensors to generate a feedback signal indicative of the difference in bridge current between the plurality of bridge circuits coupled in parallel; and
a control circuit coupled to the error generation circuit, the control circuit configured to generate control commands for driving each of the plurality of bridge circuits based at least in part on the feedback signal;
wherein the feedback signal is indicative of the difference in magnitude and phase in bridge current of the plurality of bridge circuits.

2. The control system of claim 1, wherein each of the plurality of bridge circuits comprises a pair of switching elements coupled in series with one another.

3. The control system of claim 2, wherein the plurality of switching elements comprise insulated gate bipolar transistors (IGBTs).

4. The control system of claim 1, wherein at least one inductive element is coupled between the plurality of bridge of circuits.

5. The control system of claim 1, wherein each of the plurality of current sensors comprises a current shunt.

6. The control system of claim 1, wherein the control commands comprise pulse width modulation commands for driving each of the plurality of bridge circuits.

7. The control system of claim 1, wherein the control commands are generated to reduce current imbalance between the plurality of bridge circuits coupled in parallel.

8. A method for reducing current imbalance in a power converter of a doubly fed induction generator system, the power converter coupled to a rotor of a doubly fed induction generator, the power converter comprising first and second bridge circuits coupled in parallel, the method comprising:
receiving a first signal from a first current sensor indicative of a an alternating current bridge current of the first bridge circuit;
receiving a second signal from a second current sensor indicative of a an alternating current bridge current of the second bridge circuit;
processing the first and second signals to generate a feedback signal indicative of the difference in magnitude and phase between the bridge current of the first bridge circuit and the bridge current of the second bridge circuit; and
generating control commands for driving the first and second bridge circuits based on the feedback signal to reduce current imbalance between the first and second bridge circuits.

9. The method of claim 8, wherein the control commands comprise pulse width modulation commands operable to control the pulse width modulation of the first and second bridge circuits.

10. The method of claim 8, wherein the first current sensor and the second current sensor comprise a current shunt.

11. The method of claim 8, wherein the first and second bridge circuit each comprise a plurality of insulated gate bipolar transistors.

12. The method of claim 11, wherein the method further comprises conditioning each of the control commands into gate commands for driving the insulated gate bipolar transistors.

13. A wind turbine system, comprising:
a wind driven doubly-fed induction generator having a stator and a rotor, said stator coupled to an electrical grid;
a power converter, the power converter comprising a plurality bridge circuits coupled in parallel and configured to couple the rotor of said wind driven doubly-fed induction generator to the electrical grid; and
a control system configured to control said power converter, said control system configured to monitor a an alternating current bridge current of each of the plurality of bridge circuits coupled in parallel, the control system further configured to generate a feedback signal indicative of the difference in bridge current between the plurality of bridge circuits coupled in parallel based on the bridge current of each of the plurality of bridge circuits, the control system further configured to generate control commands for driving each of the plurality of bridge circuits based at least in part on the feedback signal;
wherein the feedback signal is indicative of the difference in magnitude and phase in bridge current of the plurality of bridge circuits.

14. The wind turbine system of claim 13, wherein the power converter comprises a rotor side converter and a line side converter.

15. The wind turbine system of claim 14, wherein the plurality of bridge circuits coupled in parallel form a part of said rotor side converter.

16. The wind turbine system of claim 14, wherein the plurality of bridge circuits coupled in parallel form a part of said line side converter.

17. The wind turbine system of claim 13, wherein the control commands comprise pulse width modulation commands operable to reduce current imbalance between the plurality of bridge circuits coupled in parallel.

* * * * *